(No Model.) 2 Sheets—Sheet 1.
W. E. LINDSAY.
COTTON CHOPPER.
No. 398,417. Patented Feb. 26, 1889.
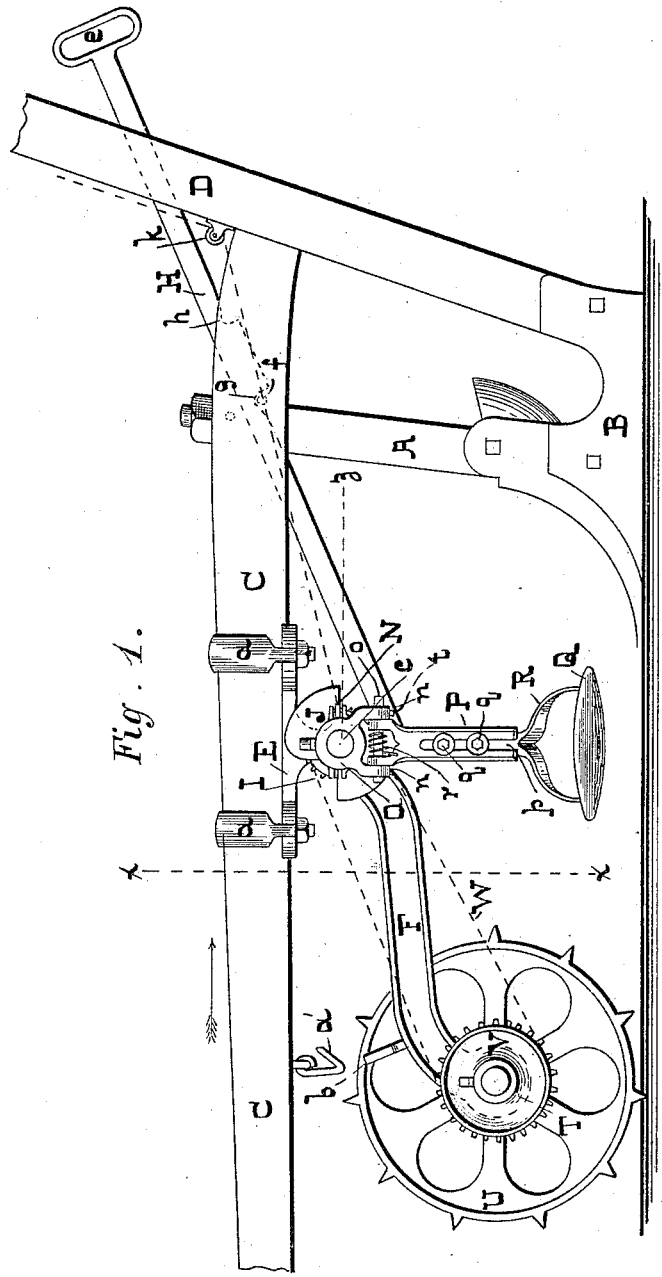
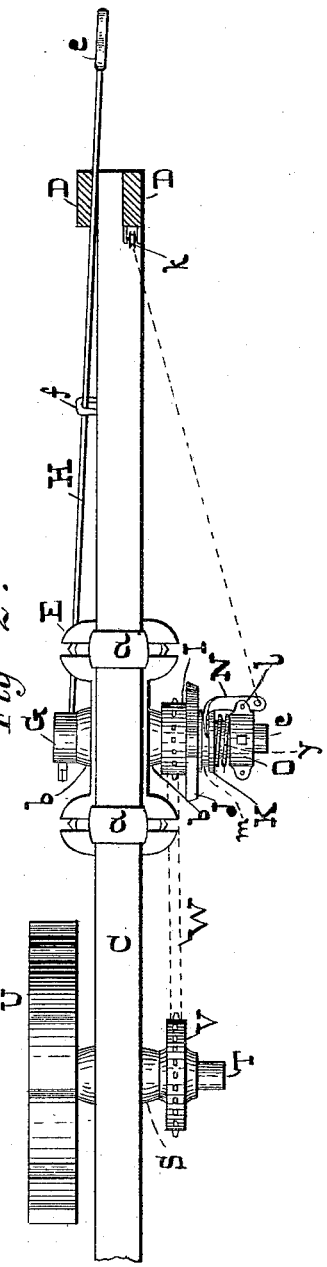
WITNESSES
Dan'l Fisher
B. H. Howard
INVENTOR
William E. Lindsay
by Geo. W. T. Howard
Atty.

(No Model.) 2 Sheets—Sheet 2.

W. E. LINDSAY.
COTTON CHOPPER.

No. 398,417. Patented Feb. 26, 1889.

WITNESSES —
Dan'l Fisher
B. W. Howard

INVENTOR —
William E. Lindsay,
by G. H. & W. T. Howard,
Attys.

UNITED STATES PATENT OFFICE.

WILLIAM E. LINDSAY, OF BALTIMORE, MARYLAND, ASSIGNOR TO JOHN M. McCLINTOCK AND WILLIAM H. RICHARDSON, BOTH OF SAME PLACE.

COTTON-CHOPPER.

SPECIFICATION forming part of Letters Patent No. 398,417, dated February 26, 1889.

Application filed September 10, 1888. Serial No. 284,991. (No model.)

*To all whom it may concern:*

Be it known that I, WILLIAM E. LINDSAY, of the city of Baltimore, and State of Maryland, have invented certain Improvements in Cotton-Choppers, of which the following is a specification.

This invention relates to certain improvements in a cotton-chopper described and claimed in an application for Letters Patent the serial number of which is 284,990, and to which specification reference should be had. In the said specification is described a machine adapted to cut away the earth from both sides of a row of cotton-plants, leaving them in an elevated ridge, and this ridge in the second or final cut is chopped away transversely at certain points, so as to leave the required plants in hills. To effect this result, the hoe is placed in the rear of the plow. Consequently the hoe operates on a completed ridge, which is, say, four inches wide. In cases where the earth is loose the cutting of the finished ridge by the hoe may have the effect of disturbing the earth forward and in the rear of the hoe, or, in other words, the hoe may make a ragged cut of greater width than itself.

The object of the present invention is to obviate this difficulty by constructing the said machine so that the hoe may cut from the finished side of a ridge up toward the solid earth, or to a point which has not been disturbed by the plow. With this in view I place the hoe in front of the plow and use a novel combination of devices for its operation, as will hereinafter fully appear.

In the further description of the said invention which follows reference is made to the accompanying drawings, forming a part hereof, and in which—

Figure 3:
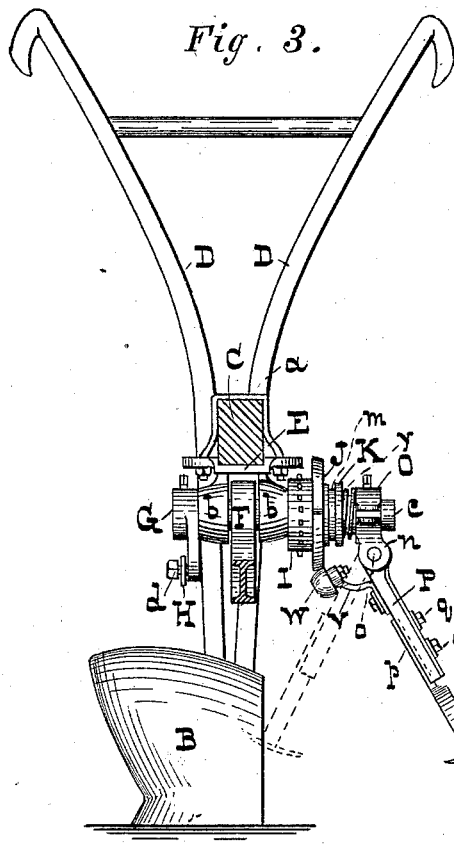
Figure 4:
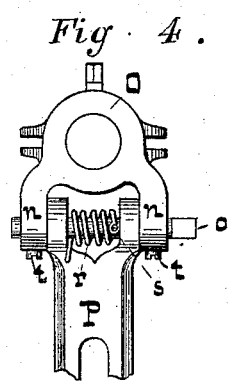
Figure 5:
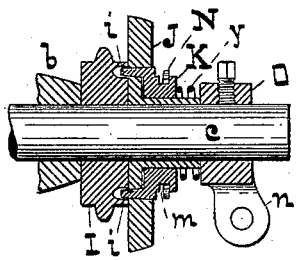

Figure 1 is a side elevation of the invention, and Fig. 2 a plan of the same. Fig. 3 is a cross-section of Fig. 1, taken on the dotted line $x$ $x$, and looking in the direction indicated by the arrow. Figs. 4 and 5 are details of the invention on an enlarged scale.

Similar letters of reference indicate similar parts in all the views.

In the said drawings, A represents the standard, to the lower end of which the plow B is secured. The plow-beam is denoted by C, and the handles are represented by D.

E is a hanger, held to the under side of the beam by means of clips $a$.

F is an arm, the upper end of which is confined sidewise between the two side pieces, $b$, of the hanger, and held so as to be susceptible of a vibratory movement through the medium of a shaft, $c$, which passes through the whole. This shaft is not secured against turning by any attachment to the hanger, but is provided with a crank, G, at one end having a pin, $d$, to which is connected a bar, H, having a handle, $e$. This bar extends from the crank-pin $d$ in an inclined position, so as to bring its handle within convenient reach of the person in charge of the machine, and it passes through a staple, $f$, in the side of the plow-beam in which it rests. The said bar is notched at its lower edge, the notches being denoted by $g$ and $h$. By moving the bar H the circumferential position of the shaft $c$ within its hanger is changed. The reason for this movement of the shaft $c$ will hereinafter appear.

I is a sprocket-wheel placed loosely on the shaft $c$, and J is a cam on the same shaft, with its inner face adjoining the sprocket-wheel.

K is a clutch fitting the hub of the cam loosely and provided with pins $i$, which pass through the cam and enter holes in the face of the sprocket-wheel I. The clutch is fitted to slide longitudinally of the hub of the cam, and the sliding motion is effected by means of a chain which passes under a sheave, $k$, on one of the handles D of the plow and extends to a lever, N, pivoted at $l$ to a collar, O.

The free end of the lever N is branched and rests in a groove, $m$, in the edge of the clutch. The collar O is secured to the shaft $c$ by a set-screw, and is provided with two lugs, $n$, to which is united by means of a small shaft, $o$, the upper and bifurcated end of the slotted arm, P.

Q is a hoe, consisting in the present case of a curved elliptical plate of steel sharpened at its edge.

R is a stirrup riveted to the hoe and terminating in a shank, $p$, which rests in a channel in the arm P, and is longitudinally adjustable therein by means of bolts $q$, which pass through the slotted arm and are screwed into holes in the shank. (See Figs. 1 and 3.)

A coiled spring, $r$, on the shaft $o$ has one of its ends secured to the shaft by a set-screw, $s$, while the other end rests on the arm P. This shaft is fitted to receive a wrench, by means of which it is turned, so as to place tension on the coiled spring. When a sufficient tension of the coiled spring is effected, the shaft is tightened in the lugs $n$ by means of set-screws $t$. The tendency of the coiled spring is to retain the hoe in the position indicated by its delineation in dotted lines in Fig. 3. Its outward movement is effected by means of a bracket, $v$, carrying a roller, $w$, which in the revolution of the cam, actuated as hereinafter described, comes into contact with its edge. The cam is shown as having two wings, so that two vibrations are produced at each revolution; but this number may be changed without altering the character of the invention.

A coiled spring, $y$, confined between the collar O and the clutch K, serves to yieldingly hold the clutch and sprocket-wheel together, so that when motion is communicated to the last-named device movement is communicated to both. It will be understood that under no circumstances are the pins which pass from the clutch through the cam withdrawn from the latter, but only from the sprocket-wheel when the same is to be detached.

The lower end of the arm F is formed into a hub, S, in which a shaft, T, is seated and adapted to turn loosely. The driving-wheel U is secured to one end of the shaft T and a sprocket-wheel, V, to the other end. This sprocket-wheel is united with the one I by a chain W. (Shown only in dotted lines).

When the machine is in operation, the hoe is made to vibrate four times at each revolution of the driving-wheel; but, as before stated, this number may be changed by altering the number of wings on the cam, or by substituting for the sprocket-wheel I one of different size. As is the case with the machine described in application Serial No. 284,990, the hoe is always rendered inoperative when the first cut is made with the plow and placed in operation as the second or return cut is made. To render the hoe inoperative, the clutch is drawn out by means of the lever N and the chain which is connected with it, and this withdraws the pins $i$ from the holes in the sprocket-wheel. The revolution of the sprocket-wheel is now rendered of no effect. The hoe may also be elevated when not required for use by drawing the bar H, which turns the shaft $c$, and with it the collar carrying the hoe-arm P. When such change is made in the position of the hoe, its general direction will be that indicated by the dotted line $z$.

The hoeing operation differs from that described in application Serial No. 284,990 in that the hoe, being in front of the plow, cuts transversely through the ridge before the same is completed, and from the completed side. By this means the hoe cuts into the solid earth instead of through a finished ridge, which is liable to be injured if the soil is loose as the hoe emerges from it.

The arm F is hooked to the plow-beam when the plow is to be used independently of the hoe, and for this purpose I provide the beam with a hook, $a'$, and the arm with an eye, $b'$.

As in case of the invention described in application Serial No. 284,990, the operative stroke or vibration of the hoe is effected by spring action, the return or back stroke only being positive in its nature.

I claim as my invention—

1. In a cotton-chopper, a plow supported from a beam, a hanger fastened to the said beam, a shaft sustained by the hanger carrying a loose sprocket-wheel, a loose cam, a loose sliding clutch on the hub of the cam, and a tight collar, to which collar is attached a vibratory arm having at its end a hoe, and adapted to be moved in one direction by the action of the said cam and in the other direction by means of a spring, combined with a driving-wheel, a sprocket-wheel having a movement in common with the said driving-wheel, and a chain belt to connect the two sprocket-wheels, substantially as and for the purpose specified.

2. In a cotton-chopper, the shaft $c$, carrying the sprocket-wheel I, cam J, clutch K, situated on the hub of the said cam, and collar O, which supports the hoe-arm P, the said clutch having pins which pass through the cam and enter holes in the side of the sprocket-wheel, whereby in the movement of the said sprocket-wheel motion is communicated to the said cam, which in turn operates the arm, substantially as and for the purpose specified.

3. In combination with the shaft which carries a collar to which the hoe-arm is hung, a crank on the said shaft and a bar connected to the pin of the said crank, whereby the said hoe-arm may be elevated so as to be inoperative, substantially as and for the purpose specified.

4. In combination with the shaft $c$, sprocket-wheel I, cam J, clutch K, and a collar, O, which carries the hoe-arm, a spring situated between the said collar and the end of the said clutch, substantially as and for the purpose specified.

WILLIAM E. LINDSAY.

Witnesses:
WM. T. HOWARD,
DANL. FISHER.